(12) United States Patent
Stone et al.

(10) Patent No.: US 9,930,485 B2
(45) Date of Patent: Mar. 27, 2018

(54) SHOELACES WITH LOCATION MONITORING SYSTEMS

(71) Applicant: DYLANbrands, Baldwin, NY (US)

(72) Inventors: Debbie Stone, Baldwin, NY (US); Carlos Juan Martinez, Homestead, FL (US)

(73) Assignee: DYLANbrands, Baldwin, NY (US)

(*) Notice: Subject to any disclaimer, the term of this patent is extended or adjusted under 35 U.S.C. 154(b) by 0 days.

(21) Appl. No.: 15/227,731

(22) Filed: Aug. 3, 2016

(65) Prior Publication Data

US 2017/0064502 A1 Mar. 2, 2017

Related U.S. Application Data

(60) Provisional application No. 62/200,116, filed on Aug. 3, 2015, provisional application No. 62/207,442, filed on Aug. 20, 2015.

(51) Int. Cl.
H04W 24/00 (2009.01)
H04W 4/02 (2018.01)
A43C 9/00 (2006.01)

(52) U.S. Cl.
CPC ............... *H04W 4/021* (2013.01); *A43C 9/00* (2013.01)

(58) Field of Classification Search
None
See application file for complete search history.

(56) References Cited

U.S. PATENT DOCUMENTS

| | | | | |
|---|---|---|---|---|
| 6,510,380 B1* | 1/2003 | Curatolo | ............... | G01S 5/0036 340/426.1 |
| 2006/0238610 A1* | 10/2006 | Teesdale | ................... | G01S 5/02 348/14.02 |
| 2007/0182548 A1* | 8/2007 | Raad | ..................... | G08B 25/009 340/539.13 |
| 2014/0192626 A1* | 7/2014 | Wolff | ................... | G04G 13/025 368/63 |
| 2015/0035672 A1* | 2/2015 | Housley | ............. | G08B 21/0275 340/539.13 |
| 2016/0058128 A1* | 3/2016 | Dalton | ..................... | A43C 7/06 36/50.1 |

* cited by examiner

*Primary Examiner* — Shantell L Heiber
(74) *Attorney, Agent, or Firm* — Eric L. Sophir; Dentons US LLP

(57) ABSTRACT

Systems and methods for monitoring the location of a wearer of a shoelace and providing alerts when the wearer is not within the pre-established parameters are disclosed. A shoelace has a location monitoring device irremovably housed within it. The location monitoring device contains a global positioning system, a transmitter, and a battery. The shoelace can include a microphone communicatively coupled to the location monitoring device. A disclosed method includes receiving, by a location monitoring server, a plurality of pre-established parameters associated a wearer of the shoelace. A unique identifier, which authenticates identity of the shoelace, and location data of the shoelace from the global positioning system housed inside the shoelace are also sent to the location monitoring server, which determines whether the location data is consistent with the plurality of pre-established parameters. An alert is transmitted to a mobile communication device upon determining the location data is not consistent with the plurality of pre-established parameters associated with that shoelace.

11 Claims, 5 Drawing Sheets

SHOELACES WITH LOCATION MONITORING SYSTEMS

CROSS-REFERENCE TO RELATED APPLICATION

This application claims the benefit of U.S. Provisional Application No. 62/200,116, filed on Aug. 3, 2015 and U.S. Provisional Application No. 62/207,442, filed on Aug. 20, 2015. The disclosure of each of the above-identified patent application is incorporated in its entirety herein by reference.

FIELD OF INVENTION

The present disclosure relates generally to apparel that incorporate location monitoring systems; more particularly to systems and methods of using shoelaces with a device including a global positioning system.

BACKGROUND

A primary concern for parents and caregivers of young children and special needs-children and adults is their location—whether their ward is at a safe location or has the ward wandered beyond the safe location. For example, certain children with autism can wander or run impulsively, causing great anxiety to their parents or caregivers. Elderly adults, who suffer from memory disorders, usually wander off and have difficulty reaching home or recollecting home addresses. Currently existing devices, such as wristbands or ankle bracelets, are prone to intentional or accidental loss or removal by the wearer.

SUMMARY

The embodiments described herein attempt to solve the above stated problem by implementing a location monitoring system inside a shoelace.

Disclosed herein is a shoelace with a location monitoring device irremovably housed within it. The location monitoring device containing a global positioning system, a transmitter, and a battery. This battery can be dependent on kinetic energy generated by movement of a wearer of the shoelace. The location monitoring device is configured to acquire two or more of a latitude coordinate, a longitude coordinate, a measurement of movement of the wearer, an altitude coordinate, and a measurement of available power from the power source. The shoelace can include a microphone communicatively coupled to the location monitoring device.

Also disclosed herein is a computer-implemented method that comprises receiving, by a location monitoring server, a plurality of pre-established parameters associated a wearer of a shoelace, wherein the shoelace contains a global positioning system, a transmitter, and a power source; acquiring, by the location monitoring server, a unique identifier and location data of the shoelace from the global positioning system housed inside the shoelace, wherein the unique identifier authenticates identity of the shoelace; determining, by the location monitoring server, whether the location data is consistent with the plurality of pre-established parameters; and transmitting, by the location monitoring server, an alert to a mobile communication device upon determining the location data is not consistent with the plurality of pre-established parameters. The global positioning system, the transmitter, and the power source are irremovably housed inside the shoelace. The shoelace can include a microphone communicatively coupled to the location monitoring device. The power source can be a kinetic battery. The location data from the global positioning device includes two or more of a latitude coordinate, a longitude coordinate, a measurement of movement of the wearer such as speed or bearing, an altitude coordinate, the number of satellites the GPS is tracking, fix quality, time stamp for the location data, and a measurement of available power from the power source. The unique identifier is a static value associated with the shoelace. The mobile communication device includes one of a smartphone, a tablet, or a personal computer. The alert transmitted from the location monitoring server includes one of a text message, an audio message, or a visual message.

Also disclosed herein is a system, comprising a location monitoring database storing a plurality of pre-established parameters associated a wearer of a shoelace, wherein the shoelace contains a global positioning system, a transmitter, and a power source; and a location monitoring server communicatively coupled to the location monitoring database, a mobile communication device, and the shoelace. The location monitoring server includes a processor; and a non-transitory computer-readable medium having instructions that when executed by the processor is configured to receive location data of the shoelace from the global positioning system housed inside the shoelace; acquire the plurality of pre-established parameters associated with the wearer of the shoelace from the location monitoring database; determine whether the location data is consistent with the plurality of pre-established parameters; and transmit an alert to the mobile communication device upon determining the location data is not consistent with the plurality of pre-established parameters. The global positioning system, the transmitter, and the power source are irremovably housed inside the shoelace. The power source is a kinetic battery. The location data from the global positioning device includes two or more of a latitude coordinate, a longitude coordinate, a measurement of movement of the wearer such as speed or bearing, an altitude coordinate, the number of satellites the GPS is tracking, fix quality, time stamp for the location data, and a measurement of available power from the power source. The unique identifier is a static value associated with the shoelace. The mobile communication device includes one of a smartphone, a tablet, or a personal computer. The alert transmitted from the location monitoring server includes one of a text message, an audio message, or a visual message.

Also disclosed herein is a location monitoring assembly distributed between a pair of shoelaces. The first shoelace is irremovably associated with a first housing unit and a first battery connectively coupled to the first housing unit. The second shoelace is irremovably associated with a second housing unit and a second battery connectively coupled to the second housing unit. Either one of the shoelaces can include a microphone communicatively coupled to the location monitoring assembly. The first housing unit contains a global positioning system and a transmitter capable of sending location data from the global positioning system to a mobile communication system in the second housing unit and the second housing unit contains the mobile communication system capable of communicating the location data to a location monitoring server. The transmitter can be a near-field communication device. The transmitter can be a Bluetooth® device. The mobile communication system can include a GSM device or a GPRS device. The mobile communication system can include a $3^{rd}$ generation or a $4^{th}$ generation or any subsequent generation wireless and cellular systems, including broadband systems.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1B:
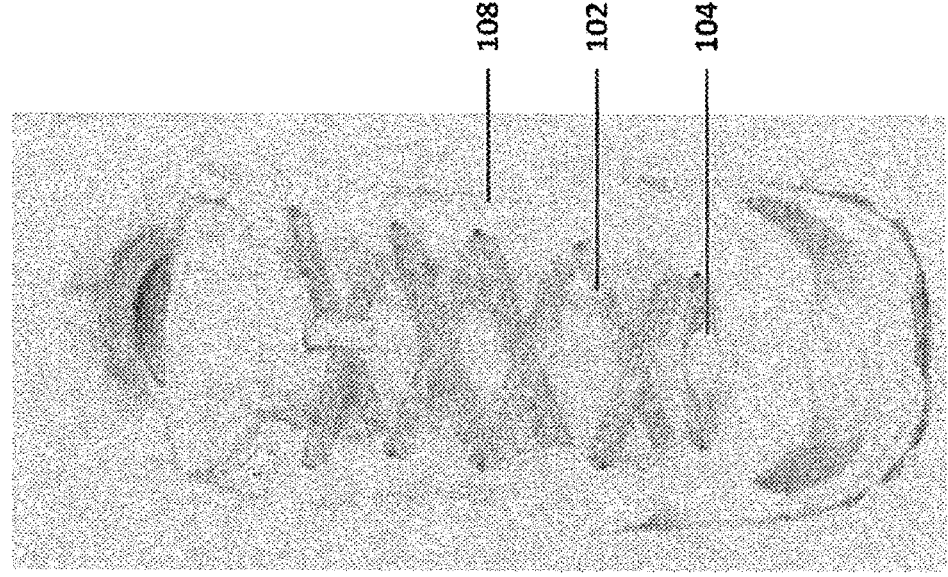
FIG. 1B illustrates the device used in a shoe according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention. Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Figure 1A:
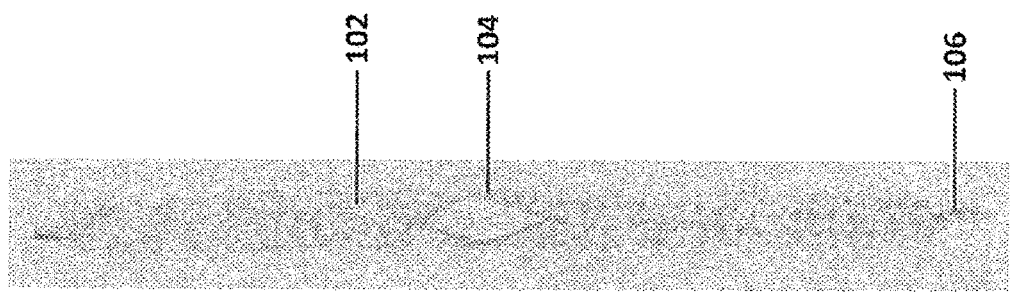
FIG. 1A illustrates a device according to an embodiment.

In an exemplary embodiment as shown in FIG. 1A, the device is a shoelace 102 housing a location monitoring device 104 inside it. In an embodiment, the location monitoring device 104 is irremovably housed inside the shoelace 102, such that the components of the location monitoring device 104 cannot be separated from the shoelace. The aglet 106 can also function as an antenna. As shown in FIG. 1B, this shoelace 102 is threaded through the eyelets of the footwear 108 similar to regular shoelaces. The location monitoring device section 104 of the shoelace 102 may occupy a slightly enlarged portion of the shoelace. In another embodiment, instead of occupying the slightly enlarged portion of the shoelace, the location monitoring device 104 of the shoelace 102 may be discreetly positioned inside the shoelace. Presence of the location monitoring device can thus be undetected by visual observation. These shoelaces 102 can be available in many different styles, materials, colors, and dimensions. These shoelaces 102 can be of varying widths, about an inch, ¼ inch, ½ inch, ⅜ inch, or 5/16 inch wide. The shoelaces 102 can also be of varying lengths, for example about 24 inches long to about 80 inches long. The shoelaces 102 can be flat, oval, round, woven, and made of different materials, such as polyester, leather and natural fabrics, such as cotton, jute, or hemp. The shoelaces can be elastic shoelaces with a spring toggle mechanism. The shoelaces can be filled with internal foam padding, or can be made of stretch fabrics with elastic inner cores. The material used for the laces can be flame retardant. In another aspect, the location monitoring device can be placed in a detachable housing that is placed inside a shoelace. The location monitoring device 104 can be housed in a waterproof case within the confines of the shoelace, such as a high strength PVC plastic waterproof housing. The location monitoring device is also designed to withstand shock and vibration, including direct impact resulting from kicking.

The shoelace can also include a microphone that is communicatively coupled to the location monitoring device. This microphone can be activated to listen or record audio signals from the surroundings of the shoelace. This microphone can be activated to facilitate real-time remote surveillance of the environment of the wearer of the shoelace. These sound signals can also be transmitted to the location monitoring server discussed below.

Figure 2:
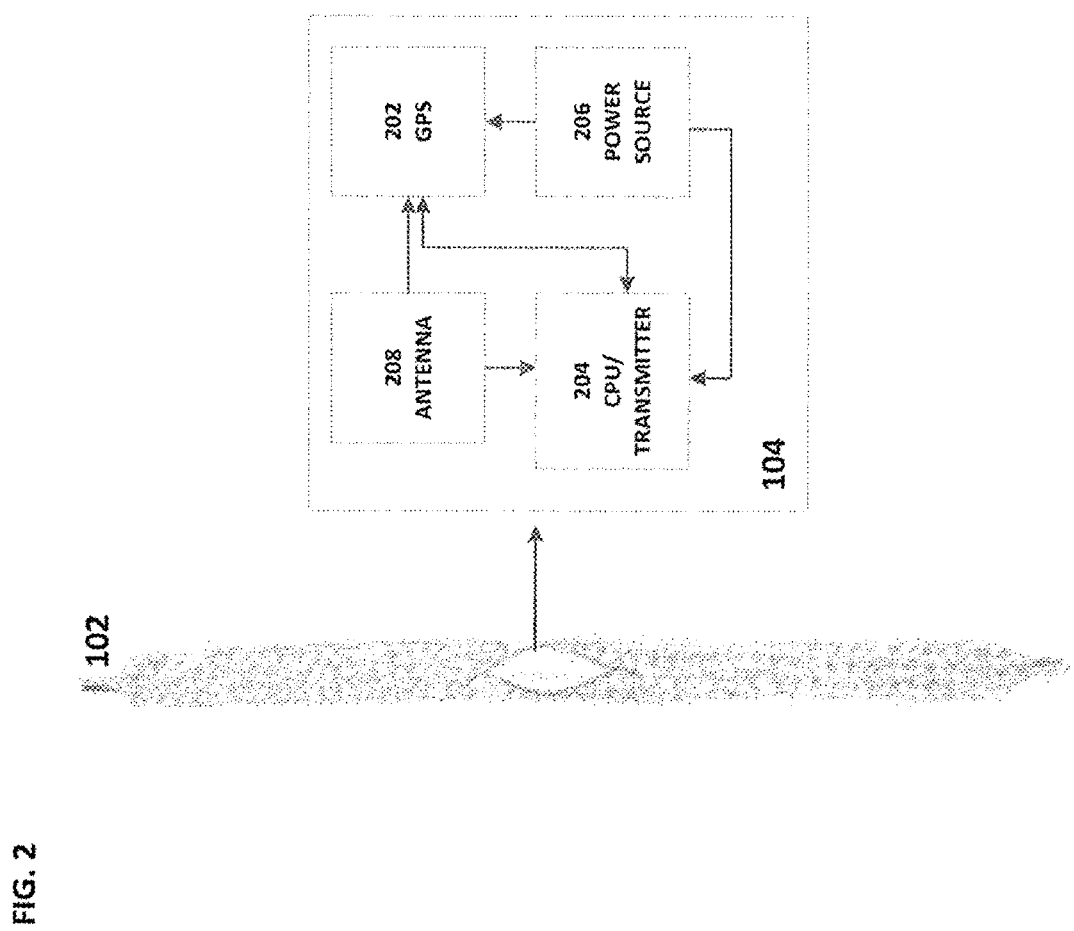
FIG. 2 illustrates a device according to an embodiment.

FIG. 2 shows certain components of the location monitoring device according to an exemplary embodiment. The location monitoring device 104 includes a global positioning system 202, a transmitter 204, and a power source 206 such as a battery. The location monitoring device can also include one or more in-built antennae 208. The global positioning system 202 includes a number of subsystems, including an antenna unit, an RF unit, and a 32-bit GPS processor unit. The global positioning system 202 can be configured to store the location data that it acquires, during intervals between transmissions of the data or if there is not enough power to transmit the information to a location monitoring server. The location data from the global positioning system 202 and a unique identifier for the location monitoring device 104 are conveyed to a location monitoring server by a transmitter 204. In an embodiment, the location data can be acquired from other global navigation satellite systems. In an embodiment, the shoelace may be comprised of suitable hardware components, firmware, and software that make the shoelace capable of being located by the location monitoring server. Location data may be acquired in any number of ways, including data from a GPS chip 204, or other satellite data, or information from cell towers based on triangulation techniques, or indoor positioning systems, such as those based on identification of proximately-located Wi-Fi hotspot locations, or combinations thereof. The location data from the global positioning device 202 includes two or more of a latitude coordinate, a longitude coordinate, a measurement of movement of the wearer such as speed or bearing, an altitude coordinate, the number of satellites the GPS is tracking, fix quality, time stamp for the location data, and a measurement of available power from the power source. The unique identifier can be a static value associated with the shoelace. The location data is transmitted to a location monitoring server using a cellular (GPRS or SMS or GSM), radio, or satellite modem embedded in the location monitoring device. The location data can be transmitted to a location monitoring server using a $3^{rd}$ generation or a $4^{th}$ generation or any subsequent generation wireless and cellular systems, including broadband systems.

The power source 206 can be a built-in rechargeable lithium-ion battery or a solar energy-based battery. The power source 206 can also be a kinetic battery that includes a mobile power generator which harvests power from movement of the wearer and stores it in a battery. Wires can run through the hollowed insides of the laces, connecting a battery to the global positioning system and the transmitter. In another aspect, the location monitoring device includes a 48 MHz microcontroller with a 2 MB storage capacity, and an environmental operating range consistent with most reasonable outdoor temperatures. Many chips support −40 F to 185 F. The shoelace with the location monitoring device is designed to withstand significant shock and vibrations, including direct impact such as kicking.

Figure 3:
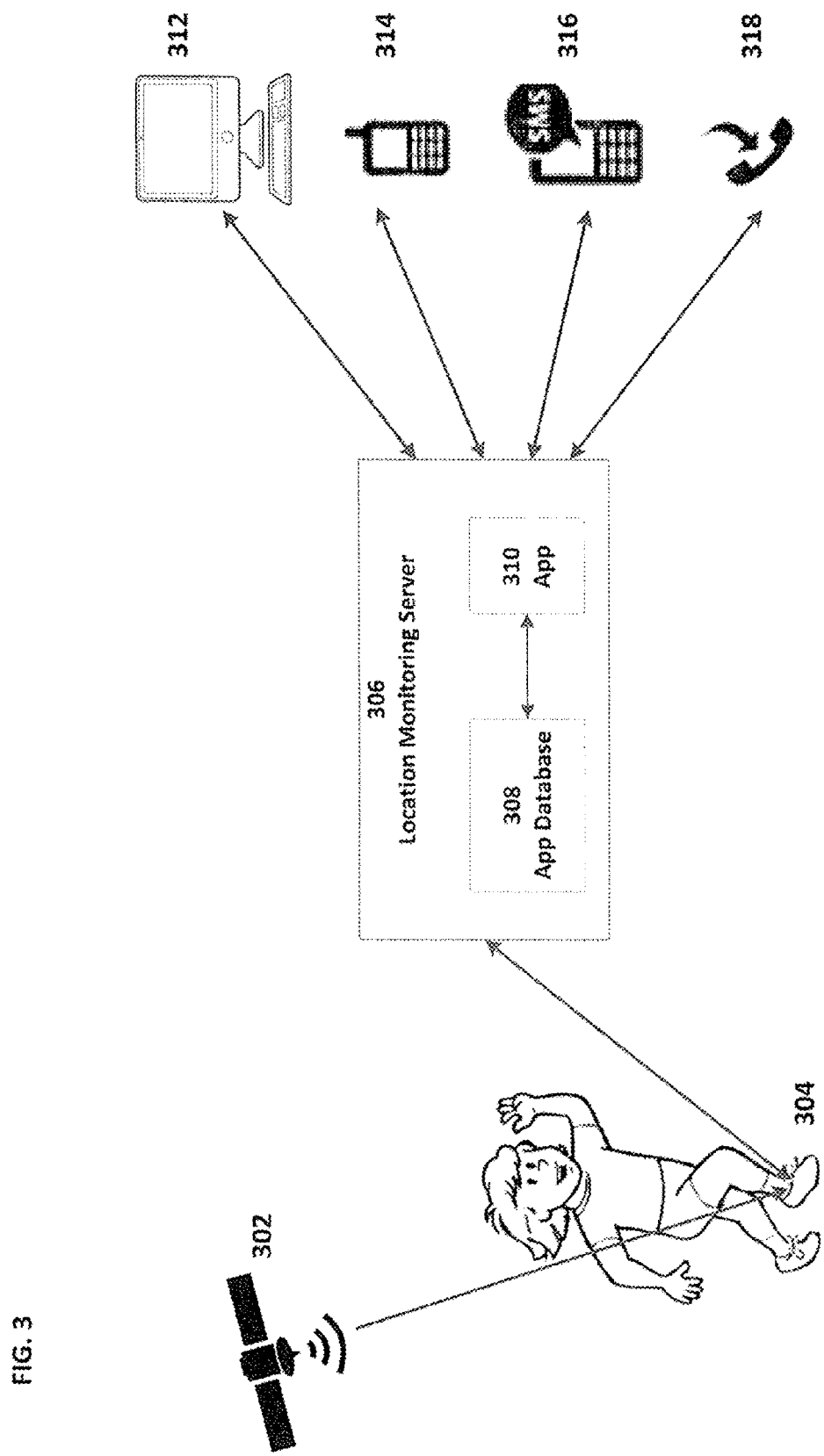
FIG. 3 illustrates a system according to an embodiment.

In an exemplary embodiment, the system of communicating information from the shoelaces to an application program involves using mobile communication devices and a location monitoring server. FIG. 3 shows an exemplary system for communicating information from the shoelaces of the wearer to a user of the location monitoring application program. The location of the wearer of the shoelaces can be tracked online or over a mobile communication device. The user has the ability to check on the location of the wearer at any time. Signals from several global positioning system satellites 302 are received by the GPS receiver that is part of the location monitoring device inside the shoelace 304 of a child. The location data is then transmitted to a location monitoring server 306 through a network. The shoelace can also include a microphone that is communicatively coupled to the location monitoring device. This microphone can be activated by the mobile communication device to listen or record audio signals from the environment of the wearer of the shoelace. These sound signals can also be transmitted to the location monitoring server and accessed by the mobile communication device.

The system includes a network, which is any public or private network communication paths to support the communications sent and received at least among the location monitoring server 306, the location monitoring application program 310, the location monitoring database 308, any of the available mobile communication devices 312, 314, 316, and 318, connected to the application server. One having ordinary skill in the art would appreciate that the network may be the intranets, local area networks (LAN), cloud networks, virtual private networks (VPN), wireless area networks (WAN), and the internet, or any other network that enables servers and user devices to interact with one another. The network may be comprised of any combination of devices and protocols capable of facilitating communication between computing devices. Non-limiting examples of devices comprising the network may include routers, switches, hubs, firewalls, proxy servers, telecommunications trunks, and the like. Accordingly, the communications network can be implemented, in whole or in part, over wireless communications network. In addition, according to various exemplary embodiments of the present invention, the wireless communications network can be implemented over any of various wireless communication technologies, for example: code division multiplexed access ("CDMA"), global system for mobile communications ("GSM"), a $3^{rd}$ generation or a $4^{th}$ generation or any subsequent generation wireless and cellular systems, including broadband systems, and wireless local area network such as WiFi, World Interoperability for Microwave Access ("WiMAX"), or Bluetooth®.

In some embodiments, the location monitoring database may comprise a plurality of computing devices cooperatively functioning as a distributed computing system. Information stored on the location monitoring database may include a wearer profile, pre-established parameters associated with the wearer, historical location data, calendar data, contacts data, authentication credentials for services, and other forms of data related to the wearer and other users associated with location monitoring devices. The wearer of the location monitoring devices may include young children, elderly people, or children and adults with special needs. The shoelaces can be used by caregivers to monitor adults suffering from mental impairment or cognitive disorders or diminished mental capacity. For example, the shoelaces can be instrumental in tracking adults suffering from Alzheimer's disease. The shoelaces can also be used by military professionals when deployed in enemy terrain. The laces can benefit athletes who are participating in time races or over dangerous terrains.

Users of the location monitoring application program may include parents, caregivers, other military professionals, race organizers, and other individuals or entities who are authorized to track the wearer, such as healthcare professionals from a nursing home or from a special needs school. Pre-established parameters associated with the wearer in the location monitoring database include location coordinates describing various regions or boundaries of locations, associated time values, or time intervals. For example, the pre-established parameters for a child wearing the shoelace can include the coordinates describing the school boundaries during school hours, then coordinates for an after-school activity such as football for a couple of hours after school, followed by the route for the child to come home. In another example, the pre-established parameters for an adult wearing the shoelace can include coordinates describing the individual's home, and coordinates from events on his calendar such as doctor's appointments and grocery store visits. The shoelaces can also include a microphone that is communicatively coupled to the location monitoring device. This microphone can be activated when the current location coordinates do not match the pre-established boundaries associated with that shoelace. Audio signals from the environment of the wearer of the shoelace can be captured by the microphone and transmitted to the location monitoring server and alerts sent to the mobile communication device for their review.

Data may be supplied by users through the application program deployed on mobile communication devices 312, 314, 316, and 318, connected to the location monitoring server. The location monitoring server 306 includes a processor; and a non-transitory computer-readable medium having instructions that when executed by the processor is configured to receive location data of the shoelace from the global positioning system housed inside the shoelace; to acquire the plurality of pre-established parameters associated with the wearer 304 of the shoelace from the location monitoring database 308; to determine whether the location data is consistent with the plurality of pre-established parameters; and transmit an alert to the mobile communication devices 312, 314, 316, and 318, upon determining the location data is not consistent with the plurality of pre-established parameters.

The mobile communication device may be any mobile device comprising a processor capable of executing the various functions described herein, examples of which include a smartphone 314, a tablet, or a personal computer 312. The alert transmitted from the location monitoring server includes one of a text message delivered to a mobile device 316, an audio message to an emergency service 318, or a visual message. In certain embodiments, a display screen of the mobile device may present users with an interactive graphical user interface, which may be an interface generated or otherwise manipulated by the location monitoring application program 310. The graphical user interface enables computer-based interactions with the location monitoring device or other devices and/or systems via a network connection. The graphical user interface can also allow for real-time tracking of the wearer of the shoelace. The graphical user interface can also allow for track and mapping of several location monitoring devices on one mobile communication device.

In an embodiment, the location monitoring application program 310 may be executed by a mobile computing device connected to a wireless data service provider, where the application program may access data services over the wireless data service provider. In an embodiment, the location monitoring application program 310 provides a secure web-based portal that certain authorized users to access the data associated with a location monitoring device, including monitoring the location of the wearer of the shoelace in real-time, viewing historical location information, capturing audio signals from the environment of the wearer by use of an in-built microphone, and viewing and changing the parameters for sending alerts.

The application program may communicate with a back-end server or cloud based platform that stores wearer locations, multiple wearer profiles, and multiple alert settings. The data services may be networked computing services, Internet based computing services, or software applications. Data services may implement various software modules and stored data. The software modules and stored data may be stored on one or more non-transitory machine-readable storage mediums, such as one or more databases residing on a single device or distributed across a plurality of devices. In an embodiment, the location monitoring application program 310 is configured to communicate (e.g., via an Application Programming Interface ("API") or other suitable technique) the information stored in the location monitoring database 308 and use the information to generate displays (e.g., graphs, charts, lists, reports, etc.) for the graphical user interface on one or more of the mobile communication devices. The API also allows for receiving of data from the mobile communication devices. In one or more embodiments, the API is any Representational State Transfer Application Programming Interface (REST API) that controls and manages one or more APIs. The API can provide web services to one or more mobile location monitoring applications installed on the mobile communication devices. Examples of these services include showing location data on a website, uploading large amounts of data that can be consumed by the location monitoring application program, downloading data to run custom analytics, exporting data, and the like.

In one or more embodiments, the location monitoring database 308 is implemented as a relational database that provides functions of fetching, indexing, and storing data. The location monitoring database 308 can be implemented through database management systems (DBMS), such as, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data. When a user uses his mobile computing device, such as a smart phone or tablet, to access the location monitoring application program, the application program uses the wireless data services to connect with physical servers hosting various network or Internet services, such as cloud services.

Figure 4:
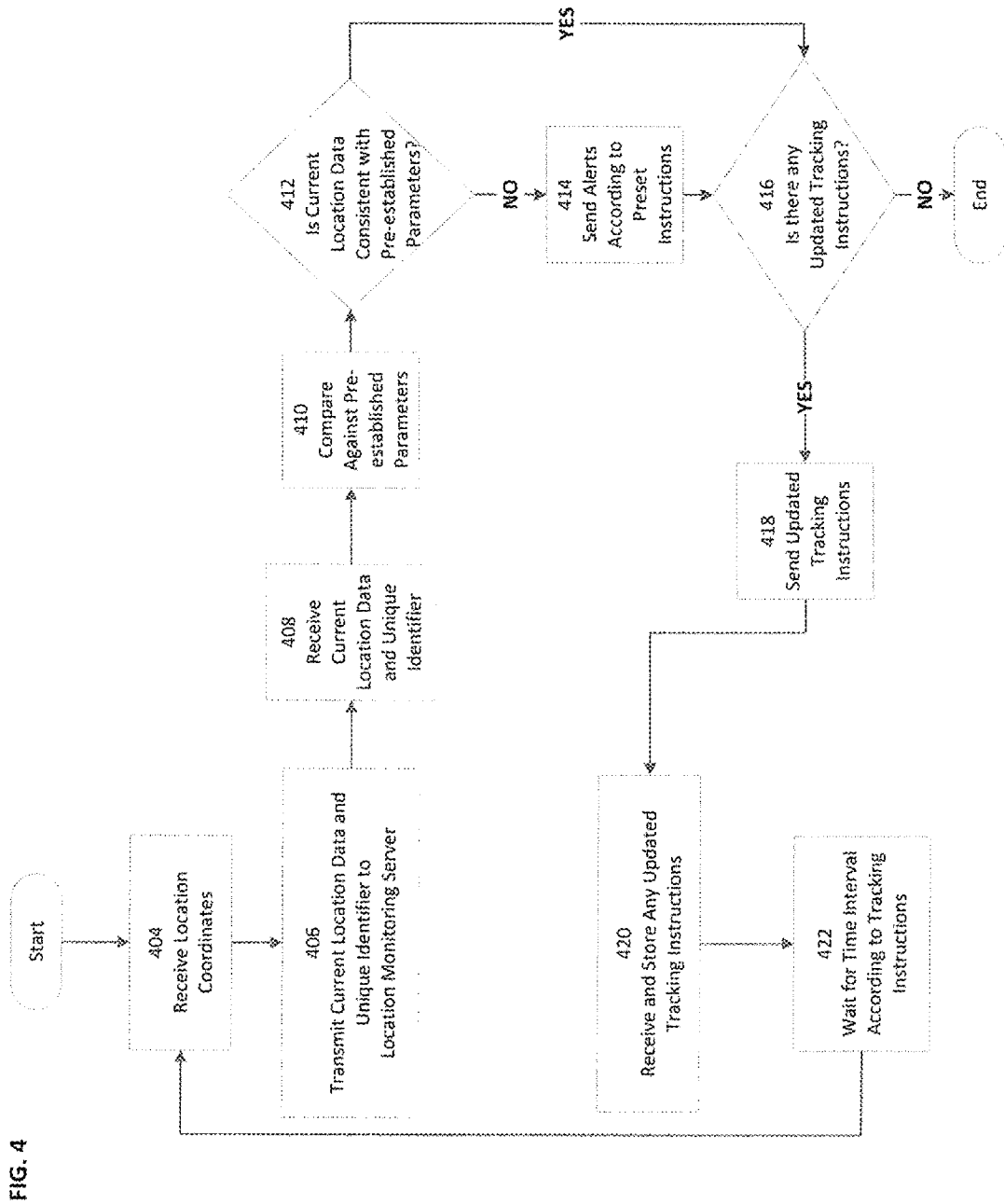
FIG. 4 illustrates a method according to an embodiment.

In an exemplary embodiment, the method of communicating information from the shoelaces to an application program involves using mobile communication devices and a location monitoring server. In one or more embodiments, the method begins when a user, such as a parent or a caregiver of a child or ward or other wearer of the shoelace with the location monitoring device, downloads and installs an app on a mobile communication device for interacting with the location monitoring system. In these embodiments, the app, such as mobile application, are GUI applications that may be available at, downloaded, and installed from a public software app store or digital application distribution platform, such as Apple iTunes®, Google Play® Store and Amazon.com®, among others. FIG. 4 shows an exemplary method for communicating information from the shoelaces of the wearer to a user of the location monitoring application program. Disclosed herein is a computer-implemented method that includes receiving 404, by a global positioning system, current location coordinates such as latitude coordinates and longitude coordinates from several global positioning system satellites. In an embodiment, the global position system is irremovably attached to the shoelace of a wearer. Current location data can include two or more of a latitude coordinate, a longitude coordinate, a measurement of movement of the wearer, an altitude coordinate, and a measurement of available power from the power source, is transmitted 406 to a location monitoring server. Along with the current location data, a unique identifier that authenticates identity of the shoelace is also transmitted.

The location monitoring server receives 408 a unique identifier and location data of the shoelace from the global positioning system housed inside the shoelace. The unique identifier is compared to the data stored in the location monitoring database. And once authenticated, the current location data is compared 410 to the plurality of pre-established parameters associated with the wearer of the shoelace, and a determination is made 412 if the current location data is consistent with the pre-established parameters.

If the current location data is consistent, then the system checks 416 to see if there are any updated tracking instructions such as instructions to increase or decrease time interval for sending current location data to the location monitoring server, or to acquire other data from the location monitoring device. Updated tracking instructions are sent 418 to the location monitoring device. The location monitoring device receives and stores 420 updated tracking instructions and acts accordingly. The device then waits 422 for the time interval according to the tracking instructions, or enters into a sleep mode for the pre-established time interval, and the steps of the computer-implemented method are repeated.

If the current location data is not consistent with the pre-established parameters, then the system sends 416 one or more alerts according to preset instructions. Parameters associated with the wearer in the location monitoring database include location coordinates describing various regions or boundaries of locations, associated time values, or time intervals. For example, the pre-established parameters for a child wearing the shoelace can include the coordinates describing the school boundaries during school hours, coordinates for an after-school activity such as football for a couple of hours after school, and coordinates for a route for the child to come home. When the current location data, received by the location monitoring server, about the child indicates that the child is in a store is, that current location data is compared to the pre-established parameters stored in the database for that particular child. As the pre-established parameters do not include a store, an alert is sent 416 to individuals according to preset instructions, such as a text message to the parents or a phone call to the babysitter. This alert can include a visual message on a display screen of a mobile device belonging to the parents. The location monitoring application program may present an interactive graphical user interface, which shows historical and current location data for the wearer of the shoelace. In response to receiving the alert, the parents can either instruct the location monitoring application program to ignore the inconsistent current location data, or include the current location data as part of the pre-established parameters, or contact the emergency rescue professionals to retrieve the child. The system checks 416 to see if there are any updated tracking instructions such as instructions to decrease time interval for sending current location data to the location monitoring server, or to acquire other data from the location monitoring device. Updated tracking instructions are sent 418 to the location monitoring device. The location monitoring device receives and stores 420 updated tracking instructions and acts accordingly. The device waits 422 for the time interval according to the tracking instructions, and the steps of the computer-implemented method are repeated.

Figure 5:
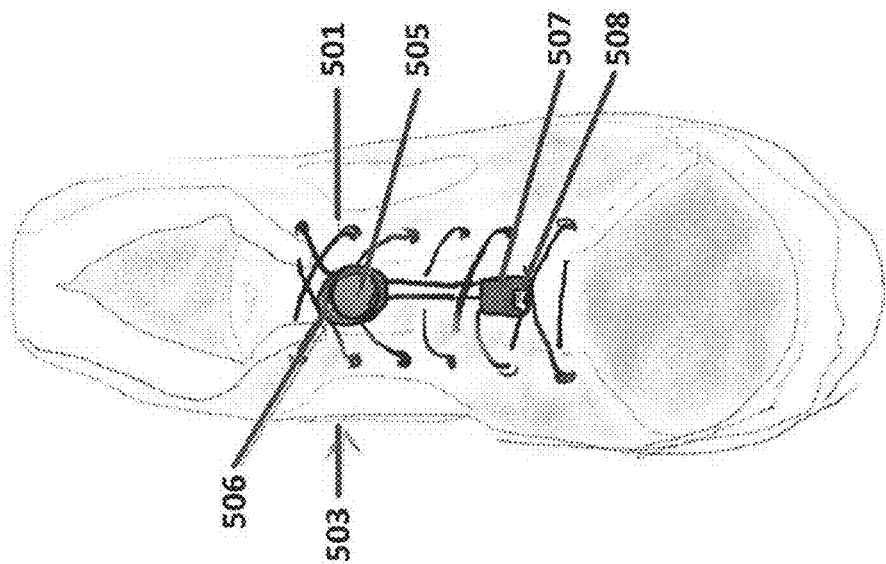
FIG. 5 illustrates a device according to another embodiment.
Figure 5:
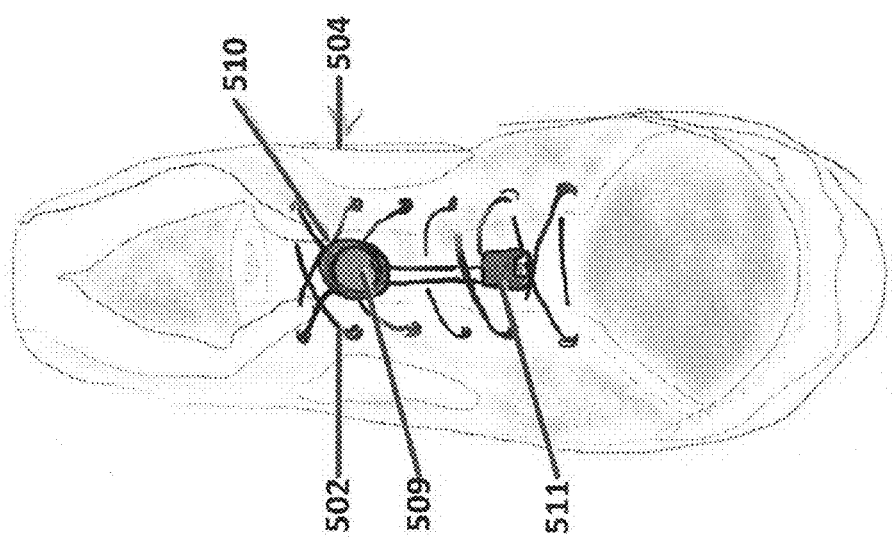

FIG. 5 shows certain components of the location monitoring device according to an exemplary embodiment. In this embodiment, components of the location monitoring device are distributed between the pair of shoelaces 501 and 502 used on a pair of shoes 503 and 504. The first shoelace 501 of the pair contains a first housing unit 505 that contains the GPS chip, a microcontroller, and a Bluetooth/NFC module. These components are responsible for tracking the current location of the wearer and sending such information to the components of shoelace 502. Optionally, this first housing unit 505 can include motion sensor, such as an accelerometer, a gyroscope, or a magnetometer, to reduce the load on the GPS chip. This first housing unit 505 is connectively coupled to a power source 506 such as a rechargeable coin battery. And the first housing unit 505 and the power source 506 can be arranged in visually attractive configurations such as concentric circles as shown in FIG. 5. Shoelace 501 can also include a first ancillary housing 507 that contains space to place an extra power source and a micro-USB port 508. The arrangement of the first housing unit 505 and the power source 506 to the first ancillary housing 507 can be similar to the Lock Laces™ system or the Yankz! Sure Lace™ system. The second shoelace 502 of the pair contains a second housing unit 509, which contains the GSM/GPRS module responsible for communicating coordinates via GSM or WiFi networks. This second housing unit 509 can include components enabling a $3^{rd}$ generation or a $4^{th}$ generation or any subsequent generation wireless and cellular system, including broadband system. This module is mostly in the sleep mode and becomes active upon receiving alert from the components of the first housing unit 505. This second housing unit 509 is connectively coupled to its own power source 510 such as a rechargeable battery. And the second housing unit 509 and the power source 510 can be arranged in visually attractive configurations such as concentric circles as shown in FIG. 5. Shoelace 502 can also include a first ancillary housing 511 that contains space to place an extra power source and an optional micro-USB port. The location monitoring device shoelaces can also include one or more in-built antennae. Either one of the shoelaces can include a microphone communicatively coupled to the location monitoring assembly. The shoelaces may also contain other suitable hardware components, firmware, and software that make the shoelace capable of being located by the location monitoring server. The location data received from components of the first housing unit 505 is transmitted to a location monitoring server using components of the second housing unit 509. This embodiment is an illustration of how the components of the location monitoring device can be distributed among the pair of shoelaces. In another embodiment, the location monitoring assembly can be distributed between the two shoelaces and the different housing units can be discreetly positioned inside the two shoelaces. So the presence of the location monitoring device as part of the shoelaces cannot be detected by visual observation.

Example 1

A parent can establish parameters in the location monitoring application program based on a child's schedule. These pre-established parameters are stored in the location monitoring database and are used to compare against current location data from the location monitoring device from the shoelace. Pre-established parameters can include that the child be at the predetermined school location between 9 am-4 pm on weekdays. If the child leaves the school at any point during that time interval, the application program sends an alert to the parent or other contact individuals, who have been preset in the system. If no one in the primary contact group responds to the alert message received, then the application program can be configured to call the school or an emergency response service. The shoelaces can be used to monitor typical children as well as children with mental impairment or cognitive disorders or diminished mental capacity. If the location monitoring device is equipped with a microphone, the guardian can also opt to activate the microphone and may listen to the audio environment surrounding the shoelace.

Example 2

The location monitoring application program can be configured to provide location of adults wearing the shoelace with the location monitoring device. The pre-established parameters can create a geo-fence. When the adult wearing the shoelace leaves the geo-fenced area, the location monitoring application program sends an alert which could be an e-mail, ringtone, or text message to one of the mobile communication devices of a caregiver or designated contact. The location monitoring application program can receive data from the location monitoring device in the shoelace and overlay the data on a maps program, such as Google® Maps. The text and map-based information can be sent to one of the mobile communication devices.

Embodiments of the invention present several advantages over existing systems. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function. The exemplary embodiments can include one or more computer programs that embody the functions described herein and illustrated in the appended figures. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein may be implemented by numerous modules or components that can perform one or multiple functions. Each module or component can be executed by a computer, such as a server, having a non-transitory computer-readable medium and processor. In one alternative, multiple computers may be necessary to implement the functionality of one module or component. Unless specifically stated otherwise as apparent from the following discussion, it is appreciated that throughout the description, discussions and terms referencing information and transfers may refer to the action and/or processes of a data processing system or similar electronic device, that manipulates and transforms data represented as physical (electronic) quantities within the system's registers and memories into other data similarly represented as physical quantities within the system's memories or registers or other such information storage, transmission or display devices. The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are only intended to be exemplary. One skilled in the art recognizes that numerous alternative components and embodiments that may be substituted for the particular examples described herein and still fall within the scope of the invention.

What is claimed is:

1. A computer-implemented method comprising:
receiving, by a location monitoring server, a first set of pre-established parameters associated with a wearer of a shoelace identified with a first time period of a schedule of the wearer, wherein the first set of pre-established parameters comprise location coordinates defining boundaries of a predetermined location, and a second set of pre-established parameters associated with the wearer of a shoelace identified with a second time period of the schedule of the wearer, wherein the second set of pre-established parameters define location information for a predetermined route to or from the predetermined location, wherein the shoelace contains a global positioning system, a transmitter, and a power source;
acquiring, by the location monitoring server, a unique identifier from the shoelace, wherein the unique identifier authenticates identity of the shoelace;
during the first time period of the schedule of the wearer:
  acquiring, by the location monitoring server, first location data of the shoelace from the global positioning system housed inside the shoelace;
  determining, by the location monitoring server, whether the first location data is consistent with the first set of pre-established parameters comprising the location coordinates defining the boundaries of the predetermined location; and
  transmitting, by the location monitoring server, a first alert to a mobile communication device upon determining the first location data is not consistent with the first set of pre-established parameters comprising the location coordinates defining the boundaries of the predetermined location; and
during the second time period of the schedule of the wearer:
  acquiring, by the location monitoring server, second location data for the shoelace;
  determining, by the location monitoring server, whether the second location data is consistent with the second set of pre-established parameters defining the location information for the predetermined route to or from the predetermined location; and
  transmitting, by the location monitoring server, a second alert to a mobile communication device upon determining the second location data is not consistent with the second set of pre-established parameters defining the location information for the predetermined route to or from the predetermined location.

2. The method of claim 1, wherein the global positioning system, the transmitter, and the power source are irremovably housed inside the shoelace.

3. The method of claim 1, wherein the shoelace further contains a microphone communicatively coupled to the location monitoring device.

4. The method of claim 1, wherein the first location data from the global positioning device includes two or more of a latitude coordinate, a longitude coordinate, an altitude coordinate, and a measurement of available power from the power source.

5. The method of claim 1, wherein the unique identifier is a static value associated with the shoelace.

6. The method of claim 1, wherein the second location includes two or more of a plurality of latitude coordinates acquired at different times during the second time period, a plurality of longitude coordinates acquired at the different times during the second time period, and a measurement of movement of the wearer.

7. The method of claim 6, wherein the measurement of movement of the wearer comprises one or more of speed and bearing.

8. A system, comprising:
   a location monitoring database storing a plurality of sets of pre-established parameters associated with a wearer of a shoelace, wherein the shoelace contains a global positioning system, a transmitter, and a power source, and wherein each of the plurality of sets of pre-established parameters is respectively associated with different predetermined time periods within a schedule of the wearer of the shoelace;
   a location monitoring server communicatively coupled to the location monitoring database, a mobile communication device, and the shoelace, the location monitoring server comprising:
      a processor; and
      a non-transitory computer-readable medium having instructions that when executed by the processor is configured, during each of the different predetermined time periods within the schedule of the wearer of the shoelace, to:
         receive, by the location monitoring server, location data of the shoelace from the global positioning system housed inside the shoelace;
         acquire, by the location monitoring server, the respective set of pre-established parameters of the plurality of sets of pre-established parameters associated with the wearer of the shoelace from the location monitoring database;
         determine, by the location monitoring server, whether the location data is consistent with the respective set of pre-established parameters of the plurality of sets of pre-established parameters; and
         transmit, by the location monitoring server, an alert to the mobile communication device upon determining the location data is not consistent with the respective set of pre-established parameters of the plurality of sets of pre-established parameters.

9. The system of claim 8, wherein the global positioning system, the transmitter, and the power source are irremovably housed inside the shoelace.

10. The system of claim 8, wherein the location data from the global positioning device includes two or more of a latitude coordinate, a longitude coordinate, a measurement of movement of the wearer, an altitude coordinate, and a measurement of available power from the power source.

11. The system of claim 8, wherein the alert transmitted from the location monitoring server includes one of a text message, an audio message, or a visual message.

* * * * *